US010785688B2

(12) United States Patent
Yau et al.

(10) Patent No.: US 10,785,688 B2
(45) Date of Patent: Sep. 22, 2020

(54) METHODS AND SYSTEMS FOR ROUTING MOBILE DATA TRAFFIC IN 5G NETWORKS

(71) Applicant: Syniverse Technologies, LLC, Tampa, FL (US)

(72) Inventors: Edward Yau, Tseung Kwan O (HK); David Zhang, Tampa, FL (US); Huiyue Xu, Tampa, FL (US); Prashant Datar, Tampa, FL (US); Ravi Tandon, Sandweiler (LU)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/698,199

(22) Filed: Nov. 27, 2019

(65) Prior Publication Data

US 2020/0187060 A1    Jun. 11, 2020

Related U.S. Application Data

(60) Provisional application No. 62/775,901, filed on Dec. 5, 2018.

(51) Int. Cl.
*H04W 4/00* (2018.01)
*H04W 36/00* (2009.01)
(Continued)

(52) U.S. Cl.
CPC ..... *H04W 36/0022* (2013.01); *H04L 61/3075* (2013.01); *H04L 61/6054* (2013.01);
(Continued)

(58) Field of Classification Search
CPC ... H04W 36/0022; H04W 76/11; H04W 8/08; H04W 8/04; H04W 88/16; H04W 76/12;
(Continued)

(56) References Cited

U.S. PATENT DOCUMENTS

2007/0258427 A1* 11/2007 Shaheen ............... H04W 76/12
370/338
2018/0020386 A1* 1/2018 Chandramouli .. H04W 36/0027
(Continued)

OTHER PUBLICATIONS

3GPP TS 23.501 version 15.2.0 Release 15, 3rd Generation Partnership Project; Technical Specification Group Services and System Aspects; System Architecture for the 5G System; Stage 2, 2018.
(Continued)

*Primary Examiner* — Chuong T Ho
(74) *Attorney, Agent, or Firm* — Andriy Lytvyn; Smith & Hopen, P.A.

(57) ABSTRACT

A routing platform for routing 4G and 5G mobile data traffic in a mobile core networks implementing Option-3 of 5G Non-Standalone deployment. The routing platform captures S6a Diameter messages sent between a Mobility Management Entity (MME) and a Home Subscriber Server (HSS) and examines the captured messages to determine whether a user equipment (UE) is configured for a 5G data connection. The routing platform intercepts a GTP Create-Session-Request message sent from a Serving Gateway (SGW) and determines whether the GTP message is associated with the UE previously determined to be configured for a 5G data connection. If the GTP message is associated with the UE configured for a 5G data connection, the GTP message is either sent to a dedicated 5G Packet Network Data Gateway (PGW) or the GTP message is modified so that a single PGW handling both 4G and 5G traffic can establish a 5G session for the UE.

45 Claims, 9 Drawing Sheets

(51) Int. Cl.
*H04W 76/12* (2018.01)
*H04W 8/04* (2009.01)
*H04W 76/11* (2018.01)
*H04L 29/12* (2006.01)
*H04W 64/00* (2009.01)
*H04W 88/16* (2009.01)
*H04W 8/08* (2009.01)

(52) U.S. Cl.
CPC ............... *H04W 8/04* (2013.01); *H04W 8/08* (2013.01); *H04W 64/00* (2013.01); *H04W 76/11* (2018.02); *H04W 76/12* (2018.02); *H04W 88/16* (2013.01)

(58) Field of Classification Search
CPC . H04W 64/00; H04L 61/3075; H04L 61/6054
USPC .................................................. 370/329, 330
See application file for complete search history.

(56) References Cited

U.S. PATENT DOCUMENTS

| | | | |
|---|---|---|---|
| 2018/0042057 A1* | 2/2018 | Johansson | H04W 76/10 |
| 2018/0092142 A1* | 3/2018 | Han | H04W 36/38 |
| 2019/0020617 A1* | 1/2019 | Truchan | H04W 88/10 |
| 2019/0141564 A1* | 5/2019 | Parikh | H04W 28/0263 |
| 2019/0297148 A1* | 9/2019 | Zong | H04W 36/00 |
| 2020/0008046 A1* | 1/2020 | Hua | H04W 4/08 |
| 2020/0053047 A1* | 2/2020 | Gambhir-Parekh | H04L 12/66 |
| 2020/0053545 A1* | 2/2020 | Wong | H04W 76/11 |
| 2020/0076518 A1* | 3/2020 | Patel | H04W 64/003 |
| 2020/0092748 A1* | 3/2020 | Teyeb | H04L 1/1848 |

OTHER PUBLICATIONS

3GPP TR 38.801 version 14.0.0, 3rd Generation Partnership Project; Technical Specification Group Radio Access Network; Study on new radio access technology: Radio access architecture and interfaces, 2017.

3GPP TS 29.060 version 12.6.0 Release 12, 3rd Generation Partnership Project; Technical Specification Group Core Network and Terminals; General Packet Radio Service (GPRS); GPRS Tunneling Protocol (GTP) across the Gn and Gp interface, 2014.

3GPP TS 29.272 version 9.9.0 Release 9, 3rd Generation Partnership Project; Technical Specification Group Core Network and Terminals; Evolved Packet System (EPS); MME and Serving GPRS Support Node (SGSN) related interfaces based on Diameter protocol, 2012.

* cited by examiner

3GPP TS29.272 (v15.5.0) - ULR

7.2.3 Update-Location-Request (ULR) Command

The Update-Location-Request (ULR) command, indicated by the Command-Code field set to 316 and the 'R' bit set in the Command Flags field, is sent from MME or SGSN to HSS.

Message Format

```
< Update-Location-Request> ::= < Diameter Header: 316, REQ, PXY, 16777251 >
    < Session-Id >
    [ DRMP ]
    [ Vendor-Specific-Application-Id ]
    { Auth-Session-State }
    { Origin-Host }
    { Origin-Realm }
    [ Destination-Host ]
    { Destination-Realm }
    { User-Name }
    [ OC-Supported-Features ]
    *[ Supported-Features ]
    [ Terminal-Information ]
    { RAT-Type }
    { ULR-Flags }
    [ UE-SRVCC-Capability ]
    [ Visited-PLMN-Id ]
    [ SGSN-Number ]
    [ Homogeneous-Support-of-IMS-Voice-Over-PS-Sessions ]
```

3GPP TS29.229

6.3.29 Supported-Features AVP

The Supported-Features AVP is of type Grouped. If this AVP is present it may inform the destination host about the features that the origin host supports for the application. The Feature-List AVP contains a list of supported features of the origin host. The Vendor-Id AVP and the Feature-List-ID AVP shall together identify which feature list is carried in the Supported-Features AVP for the Application-ID present in the command header.

Where a Supported-Features AVP is used to identify features that have been defined by 3GPP, the Vendor-Id AVP shall contain the vendor ID of 3GPP. Vendors may define proprietary features, but it is strongly recommended that the possibility is used only as the last resort. Where the Supported-Features AVP is used to identify features that have been defined by a vendor other than 3GPP, it shall contain the vendor ID of the specific vendor in question.

If there are multiple feature lists defined by the same vendor and the same application, the Feature-List-ID AVP shall differentiate those lists from one another. The destination host shall use the value of the Feature-List-ID AVP to identify the feature list.

AVP format

```
Supported-Features ::= < AVP header: 628 10415 >
                      { Vendor-Id }
                      { Feature-List-ID }
                      { Feature-List }
                      *[ AVP ]
```

*3GPP TS 29.272 V15.5.0 (2018-09)*

Table 7.3.10/2: Features of Feature-List-ID 2 used in S6a/S6d

| Feature bit | Feature | M/O | Description |
|---|---|---|---|
| 27 | NR as Secondary RAT | O | Support of NR as Secondary RAT<br><br>This feature is applicable to the ULR/ULA and IDR/IDA command pairs over S6a (and S6d) when the MME (or combined MME/SGSN) supports NR as Secondary RAT, and over S6d when the SGSN supports the indication related to NR as Secondary RAT (such as, e.g., the related Access Restriction Data, or extended QoS parameters).<br><br>If the MME, SGSN, or combined MME/SGSN does not support this feature, the HSS shall not send (in ULA) or update (in IDR) subscription data related to NR as Secondary RAT.<br><br>If the HSS does not support this feature, the MME shall ignore the bit "NR as Secondary RAT Not Allowed" in Access-Restriction-Data. |

FIG. 4

7.2.4 Update-Location-Answer (ULA) Command

The Update-Location-Answer (ULA) command, indicated by the Command-Code field set to 316 and the 'R' bit cleared in the Command Flags field, is sent from HSS to MME or SGSN.

Message Format

```
< Update-Location-Answer> ::= < Diameter Header: 316, PXY, 16777251 >
                              < Session-Id >
                              [ DRMP ]
                              [ Vendor-Specific-Application-Id ]
                              [ Result-Code ]
                              [ Experimental-Result ]
                              [ Error-Diagnostic ]
                              [ Auth-Session-State ]
                              { Origin-Host }
                              { Origin-Realm }
                              [ OC-Supported-Features ]
                              [ OC-OLR ]
                            * [ Load ]
                            * [ Supported-Features ]
                              [ ULA-Flags ]
                              [ Subscription-Data ]
                            * [ Reset-ID ]
                            * [ AVP ]
                              [ Failed-AVP ]
                              [ Proxy-Info ]
                            * [ Route-Record ]
```

7.3.2 Subscription-Data

The Subscription-Data AVP is of type Grouped. It shall contain the information related to the user profile relevant for EPS and GERAN/UTRAN.

AVP format

```
Subscription-Data::= <AVP header 1400 10415>
                     [ Subscriber-Status ]
                     [ MSISDN ]
                     [ A-MSISDN ]
                     [ STN-SR ]
                     [ ICS-Indicator ]
                     [ Network-Access-Mode ]
                     [ Operator-Determined-Barring ]
                     [ HPLMN-ODB ]
                    *10[ Regional-Subscription-Zone-Code ]
                     [ Access-Restriction-Data ]
```

Table 7.3.31/1: Access-Restriction-Data

| Bit | Description |
|---|---|
| 0 | UTRAN Not Allowed |
| 1 | GERAN Not Allowed |
| 2 | GAN Not Allowed |
| 3 | I-HSPA-Evolution Not Allowed |
| 4 | WB-E-UTRAN Not Allowed |
| 5 | HO-To-Non-3GPP-Access Not Allowed |
| 6 | NB-IoT Not Allowed |
| 7 | Enhanced Coverage Not Allowed |
| 8 | NR as Secondary RAT in E-UTRAN Not Allowed |
| 9 | Unlicensed Spectrum as Secondary RAT Not Allowed |
| 10 | NR in 5GS Not Allowed |
| NOTE: | Bits not defined in this table shall be cleared by the HSS and discarded by the receiving MME/SGSN. |

FIG. 5

METHODS AND SYSTEMS FOR ROUTING MOBILE DATA TRAFFIC IN 5G NETWORKS

PRIORITY CLAIM

This non-provisional application claims priority to a U.S. Provisional Application having Ser. No. 62/775,901 filed on Dec. 5, 2018.

BACKGROUND OF THE INVENTION

1. Field of the Invention

This invention relates generally to the field of telecommunications. Specifically, the invention pertains to data traffic routing in 5G Non-Standalone Mode Option-3, Option-3a, and Option-3x.

More specifically, the invention relates to methods and systems for implementing a routing scheme for routing 4G and 5G mobile data traffic towards a Packet Data Network Gateway (PGW) in mobile core networks when 5G Non-Standalone mode Option-3, Option-3a, or Option-3x is used.

2. Brief Description of the Related Art

In the fifth generation of cellular mobile communications (5G), there are two deployment architectures: "Non-Standalone (NSA) mode" and "Standalone (SA) mode." NSA mode utilizes 4G Evolved Packet Core (EPC), whereas, SA mode utilizes 5G Core networks. Details of 5G architecture are described in 3GPP TS23.501 "3rd Generation Partnership Project; Technical Specification Group Services and System Aspects; System Architecture for the 5G System; Stage 2," which is incorporated herein by reference.

NSA and SA architectures can be further divided into multiple deployment options: namely, Options 1, 2, 3, 4, 5, 6, and 7. There are also sub-variants of each option-specifically, Option-3 can be further subdivided into Option-3, Option-3a, and Option-3x. The present invention pertains to Option-3, Option-3a, and Option-3x. Details of 5G deployment options are described in 3GPP TR38.801 "$3^{rd}$ Generation Partnership Project; Technical Specification Group Radio Access Network; Study on new radio access technology: Radio access architecture and interfaces," which is incorporated herein by reference.

Option-3 is a NSA architecture that utilizes 4G EPC as the core network. Option-3 is a 'dual connectivity' option, which means mobile devices have dual connectivity to both 4G RAN (eNodeB or eNB), as well as 5G New Radio (gNodeB or gNB). In this option, 4G eNB is used as a primary connectivity point, whereas, 5G gNB connectivity is secondary. The radio link control is managed by 4G eNB.

Many network operators choose NSA Option-3 to launch 5G services as the initial deployment option. Option-3 is easier and less costly to implement because it utilizes the existing core network elements and removes the impact on backend systems and roaming interfaces because they are based on the existing 4G EPC.

By utilizing 4G EPC, 5G NSA Option-3 continues to use the GPRS Tunneling Protocol (GTP) for both control and data plane traffic between Serving Gateway (SGW) and Packet Data Network Gateway (PGW) and will break-out user data to the Internet or application servers.

GPRS Tunneling Protocol (GTP) is a protocol defined in $3^{rd}$ Generation Partnership Project (3GPP) TS 29.060 (3rd Generation Partnership Project; Technical Specification Group Core Network and Terminals; General Packet Radio Service (GPRS); GPRS Tunneling Protocol (GTP) across the Gn and Gp interface). This tunneling protocol is used to carry mobile data traffic between Serving GPRS Support Node (SGSN) and Gateway GPRS Support Node (GGSN) in 2.5G/3G networks, and between SGW and PGW in LTE networks. The same protocol is used in 5G NSA mode.

There are three main categories of 5G use cases: 1) enhanced Mobile BroadBand (eMBB); 2) Massive Internet of Things (mIoT); and 3) Ultra-Reliable Low-Latency Communication (URLLC). Each of these user cases has its own characteristics of network connectivity requirements. For example, eMBB requires a very high bandwidth in accessing the Internet. Massive IoT requires allocation of large number of IP addresses and requires that data must be transmitted in a highly security path. URLLC requires a low latency internet network breakout connectivity. In all three use cases, the requirements are substantially different than those of 4G.

Although NSA Option-3 can take advantage of the improvement in 5G NR for the radio access, NSA Option-3 cannot fully address the above specific needs of 5G use cases because they utilize the same 4G core network and internet access paths. Traditionally in 3G and 4G, a common way to differentiate data access paths involved using 'Access Point Name' (APN). Usually, network operators assign a common APN, such as 'internet' for 'normal' user traffic. A different APN can be assigned for specific use case, such as 'Blackberry' or 'WAP'.

When migrating subscribers from 4G to 5G, it is advantageous for mobile network operators to use the same APNs they used in 3G and 4G, thereby, ensuring service continuity in 3G/4G networks. However, when the same APN is used, the backend core network element—primarily the PGW—cannot use the APN to differentiate 4G and 5G data traffic.

Another method of differentiating radio access involves using the Radio Access Technology Type 'RAT-Type.' RAT-Type is an attribute that SGW sends to PGW when creating a PDP session. Different radio access has different RAT-Type, such as GERAN, UTRAN, EUTRAN and NR. Although 'NR' is defined for 5G RAT-Type, in 5G NSA Option-3, this value actually uses the same value 'EUTRAN' as in 4G because the primary radio in Option-3 is 4G eNodeB. Thus, PGW cannot use this attribute to differentiate 5G data from 4G.

In 4G EPC, S6a is an interface between Mobility Management Entity (MME) and Home Subscriber Server (HSS). This interface is based on Diameter protocol as defined by IETF RFC 3588 and RFC6733. Details of S6a interface are described in 3GPP TS29.272 "3rd Generation Partnership Project; Technical Specification Group Core Network and Terminals; Evolved Packet System (EPS); MME and Serving GPRS Support Node (SGSN) related interfaces based on Diameter protocol." The S6a interface is used to exchange data when a UE attaches to a 4G network and when subsequent mobility events occur, such as the UE changing its location. Because 5G NSA Option-3 utilizes the 4G EPC, the same S6a interface applies.

This invention pertains to a method and platform for routing 5G user data in NSA Option-3 in the core network internet access to address the specific use cases of 5G applications (as opposed to 4G traffic). It utilizes the information elements in S6a Diameter messages between MME and HSS to make the decision.

SUMMARY OF THE INVENTION

In an embodiment, the invention is a routing platform for routing 4G and 5G mobile data traffic in a mobile network implementing a 5G Non-Standalone (NSA) deployment. The routing platform includes a packet mirror function configured to capture a S6a Diameter message transmitted between a MME and a HSS. The captured S6a Dimeter message can be an Update-Location-Request (ULR) or an Update-Location-Answer (ULA). The captured message carries an identifier—e.g., an International Mobile Subscriber Identity (IMSI)—for a User Equipment (UE) attached with the mobile network.

The routing platform also includes an Analysis Function. The Analysis Function analyzes the captured S6a Diameter message to determine whether the UE is configured for a 5G data connection or a 4G data connection. If the Analysis Function determines that the UE is configured for 5G data connection, the identifier of the UE is saved to a database.

The Analysis Function can determine whether the UE is configured for the 4G data connection or the 5G data connection based on an Attribute-Value-Pair of the ULR message. In an embodiment, the Analysis Function determines whether the UE is configured for the 5G data connection based on a value of Feature Bit #27 'NR as Secondary RAT' in a 'Feature-List-ID 2' field of a 'Supported Features' AVP of the ULR message. The Analysis Function can also determine whether the UE is configured for the 5G data connection based on an AVP of the ULA message. This can be accomplished based on a value of Bit #8 'NR as Secondary RAT in E-UTRAN Not Allowed' in an 'Access Restriction Data' field in a 'Subscription Data' AVP of the ULA message.

The routing platform further includes a General Packet Radio Service Tunneling Protocol (GTP) Proxy, which is deployed between a Severing Gateway (SGW) and a Packet Data Network Gateway (PGW). The GTP-Proxy is configured to receive a GTP message—e.g. Session-Create-Request—from the SGW for creating a Packet-Data Protocol (PDP) session for the UE. The Analysis Function checks a UE identifier in the GTP message against the database to determine whether the UE identifier in the GTP message matches the UE identifier previously stored in the database containing identifiers of the UEs that the Analysis Function determined to be configured for a 5G data connection. If the UE identifier in the GTP message is listed in the database, then the GTP-Proxy sends the GTP message toward the PGW for creating a 5G PDP session for the UE.

In an embodiment, the mobile network can have two separate PGWs: a 4G-PGW for 4G data traffic and a 5G-PGW for 5G data traffic. In this embodiment, responsive to determining that the UE identifier in the GTP message is listed in the database, the GTP-Proxy sends the GTP message toward the 5G-PGW. If the UE identifier is not listed in the database, the GTP-Proxy send the message toward the 4G-PGW.

In an embodiment, the mobile network has a single PGW configured to handle both the 4G data traffic and the 5G data traffic. In this embodiment, responsive to determining that the UE identifier in the GTP message is listed in the database, the GTP-Proxy modifies the GTP message to indicate that the GTP message is for creating a 5G data session and sends the modified GTP message toward the PGW. The modified GTP message enables the PGW to handle the 4G data traffic and the 5G data traffic differently. If the UE identifier in the GTP message is not listed in the database, then the GTP-Proxy forwards the GTP message toward the PGW without modification.

In an embodiment, the GTP-Proxy modifies the GTP message by modifying an Access Point Name (APN) included in the GTP message to indicate that the PDP session is the 5G PDP session. Alternatively, or additionally, the GTP-Proxy can set an Information Element (IE) included in the GTP message to a predefined value to indicate that the PDP session is the 5G PDP session.

BRIEF DESCRIPTION OF THE DRAWINGS

For a fuller understanding of the invention, reference should be made to the following detailed disclosure, taken in connection with the accompanying drawings, in which:

FIG. 4 is a diagram schematically depicting the attributes related to this invention in Diameter S6a Update-Location-Request messages. The related attribute is Feature Bit #27 'NR as Secondary RAT' in 'Feature-List-ID 2' of 'Supported Features' Attribute-Value-Pair (AVP).

FIG. 5 is a diagram schematically depicting the attributes related to this invention in Diameter S6a Update-Location-Answer messages. The related attribute is Bit #8 'NR as Secondary RAT in E-UTRAN Not Allowed' in 'Access Restriction Data' AVP in 'Subscription Data' AVP.

DETAILED DESCRIPTION OF THE PREFERRED EMBODIMENT

Figure 1:
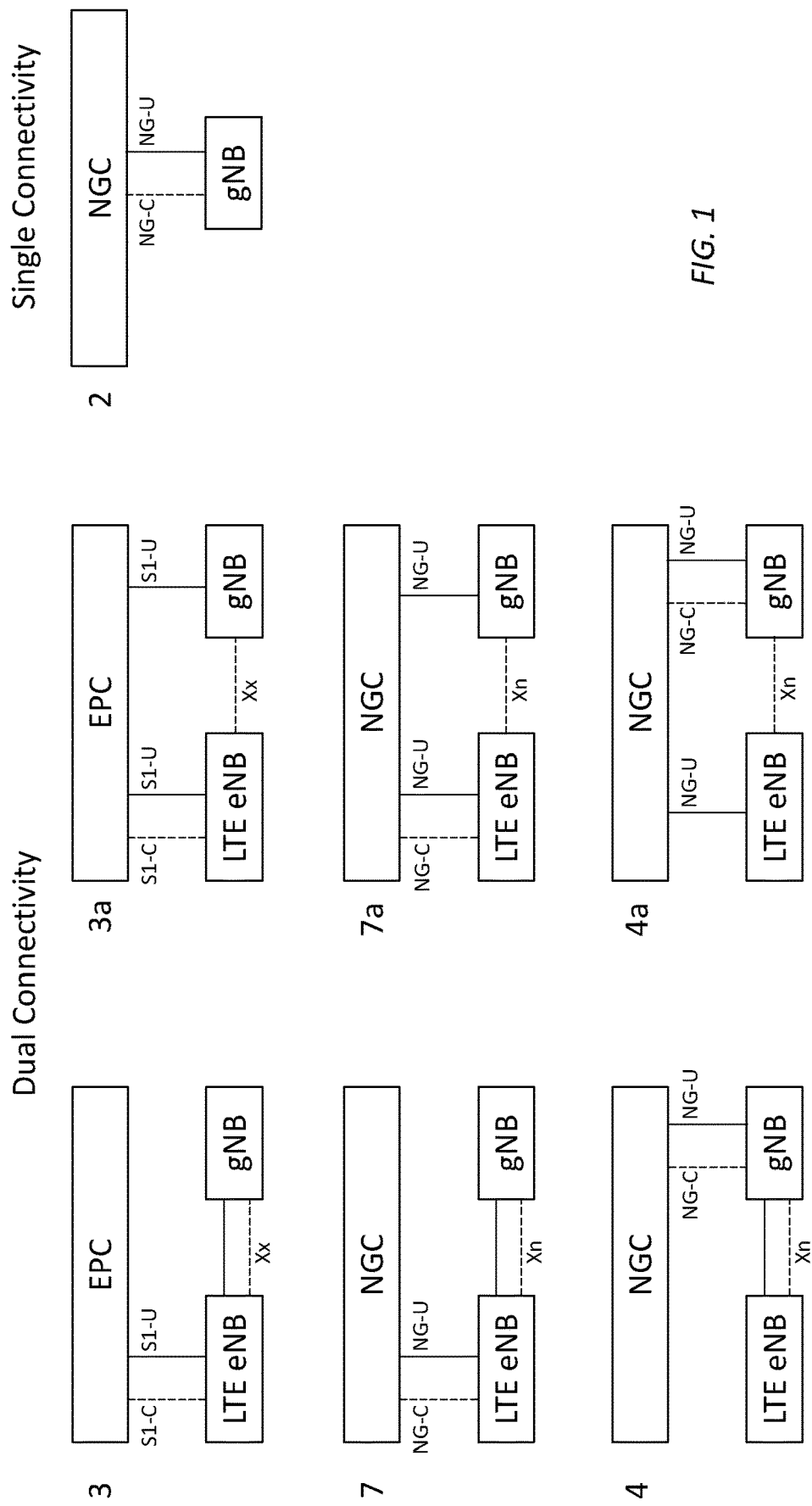
FIG. 1 is a diagram from 3GPP depicting the different architectural options for New Radio Area Network (RAN) used in 5G.

FIG. 1 schematically depicts multiple options for 5G deployment. An embodiment of this invention relates to Option-3, Option-3a, and Option-3x (not shown) of 5G deployment. Option-3, Option-3a, and Option-3x pertain to Non-Standalone (NSA) Mode of 5G deployment, which uses a 4G Evolved Packet Core (EPC) as a network core. In Option-3, Option-3a, and Option-3x, a 5G device has dual connectivity to both 4G eNB 14 and 5G gNB 16 via EPC.

Figure 2:
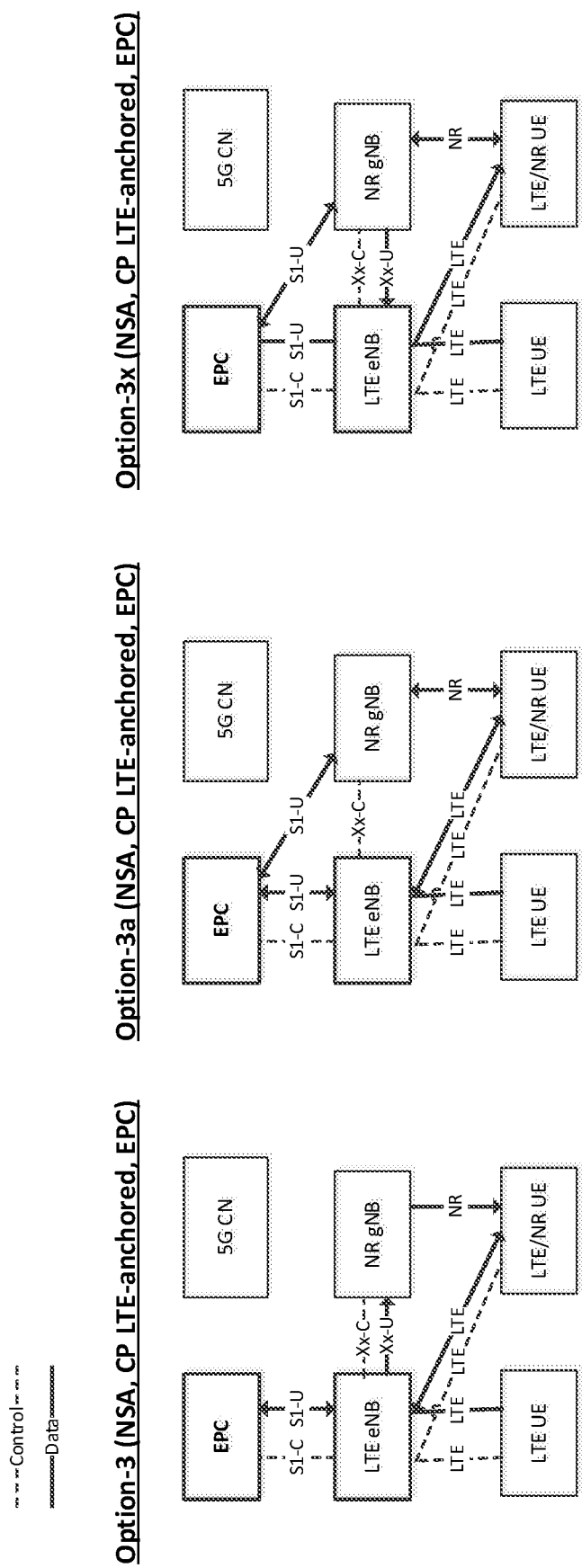
FIG. 2 is a block diagram schematically depicting the network connectivity and characteristics of 5G NSA Option-3 variants, namely Option-3, Option-3a and Option-3x.

FIG. 2, depicts three variants of Option-3 of 5G deployment: Option-3, Option-3a, and Option-3x. All three variants share the same following characteristics: 1) they all pertain to the NSA mode, which uses 4G EPC as network core, 2) in all three variants, control planes are LTE-anchored, and 3) in all three variants, a 5G User Equipment (UE) 18 has dual connectivity to both 4G eNB 14 (primary radio) and 5G gNB 16 (secondary radio). In all variants of Option-3, 4G eNB 14 is used for the primary connectivity, while connectivity to 5G gNB 16 is secondary, and the radio link control is managed by 4G eNB 14.

As explained in the Background section, Option-3 (and its variants) appeals to many network operators because it enables the network operators to continue using their existing 4G eNBs. In this implementation 4G eNB is used for both 4G and 5G data traffic. This aspect creates a problem because the backend core network element-primarily the Packet Data Network Gateway (PGW)—cannot differentiate the 4G data traffic from 5G data traffic because the 'NR' value is the same regardless of whether the traffic is 4G or 5G. Furthermore, when migrating subscribers from 4G to 5G networks in Option-3 of 5G deployment, network operators may find it advantageous to use the same Access Point Names (APNs), that have been used in 3G and 4G networks. By using the same APNs, network operators would ensure service continuity. However, when the same APNs are used, the APNs cannot be used to differentiate 4G and 5G data traffic. The invention addresses this problem.

Figure 3:
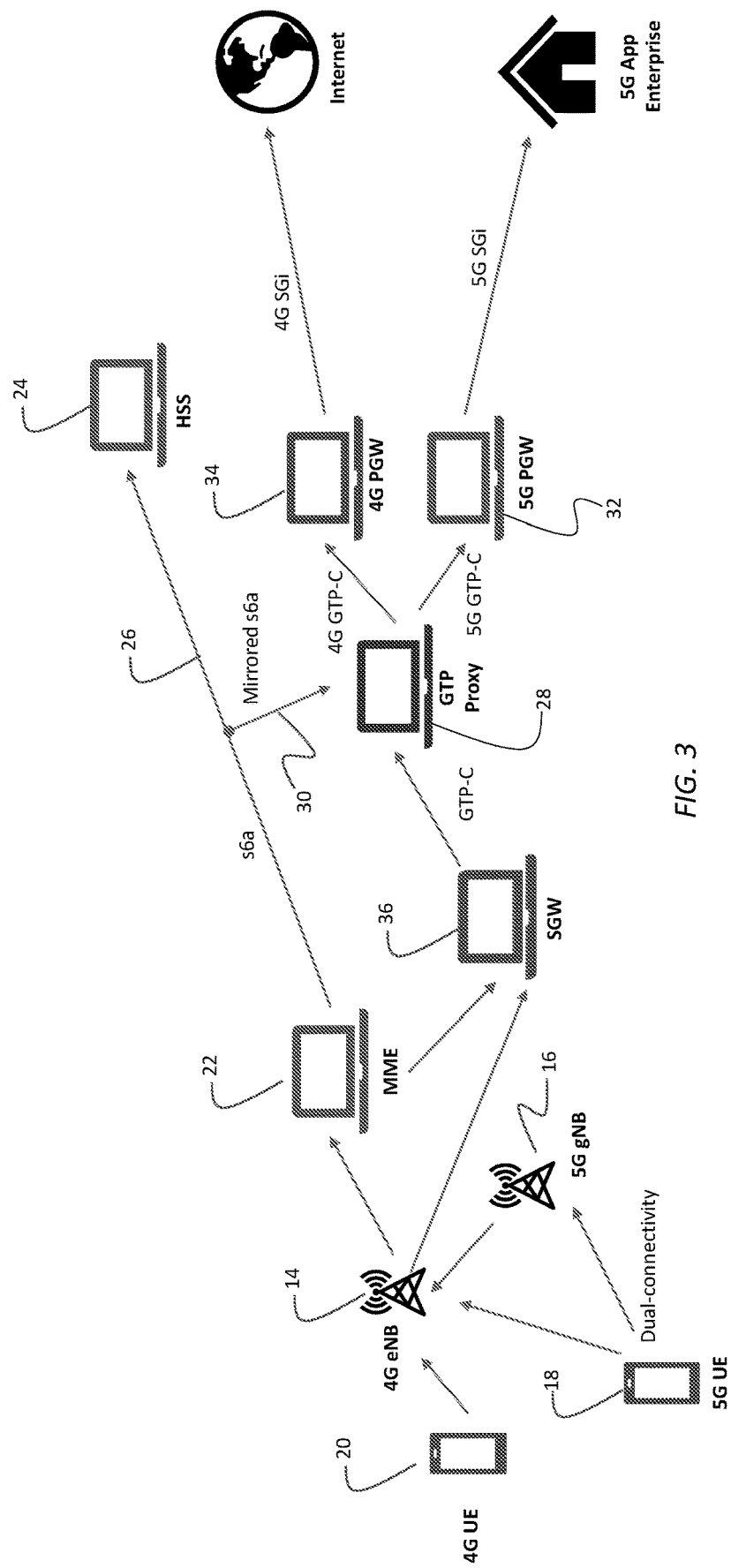
FIG. 3 is a diagram depicting architecture of an embodiment of the invention in which the mobile network has a 4G-PGW and a 5G-PGW.

The architecture of an embodiment of the invention is depicted in FIG. 3. This embodiment consists of networking and application systems that include 1) a Packet Mirror function to capture S6a Diameter messages between MME 22 and HSS 24, 2) an 'Analysis Function' to analyze and filter the S6a Diameter messages for 5G users and device attachment operations, and 3) a GTP-Proxy 28 configured to selectively redirect or proxy GTP messages to either a 5G-PGW 32 or 4G-PGW 34.

FIG. 3 depicts an embodiment in which two PGWs are used: a 4G-PGW 32 to handle 4G data traffic and a 5G-PGW 34 and 5G data traffic. FIG. 3 further depicts that LTE eNB 14 is used to enable 5G connection for 5G-UE 18 and is also used to enable 4G connection for 4G-UE 20. FIG. 3 illustrates that 5G-UE 18 is dual-attached to both 4G eNB 14 and 5G gNB 16. To use 5G connectivity, 5G-UE 18 communicates with 5G gNB 16, which then communicates with 4G eNB 14.

Continuing reference to FIG. 3: when either a 5G-UE 18 or a 4G-UE 20 attaches to a network, 4G eNB 14 establishes a signaling connection with Mobility Management Entity (MME) 22. Next, MME 22 sends a Diameter Update-Location-Request (ULR) message to Home Subscriber Server (HSS) 24 via S6a interface 26. Responsive to receiving the ULR message, HSS 24 replies to the MME 22 with an Update-Location-Answer (ULA) message.

A Packet Mirror function is used to passively capture ULR and ULA messages between MME 22 and HSS 24. This functionality can be achieved using a network mirroring technique, such as Switched Port Analyzer (SPAN) at network switches or by analyzing Transaction Detailed Record (TDR) from Diameter Routing Agents (DRA) or HSS 24. FIG. 3 further depicts that the mirrored S6a data feed 30 is sent to a network element referred to herein as a GTP-Proxy 28.

GTP-Proxy 28 may include an Analysis Function configured to analyze the captured ULR and/or ULA Diameter messages sent via mirrored S6a data feed 30. Upon receiving the Diameter messages from the packet mirror function, the Analysis Function analyses, extracts, and examines key attributes in the ULR messages. Some of the key attributes of the GTP message analyzed by the Analysis Function may include the following: 'Origin-Realm' which indicates serving network identity, 'Destination-Realm' which indicates HSS domain, User-Name (which carries International Mobile Subscriber Identity (IMSI) to indicate mobile user identity), command-code (which indicates S6a message type), RAT-Type (which shall indicate EUTRAN for 4G Radio), Visited-PLMN-Id (which indicates visiting operator identity while roaming) and Supported-Features (which indicates whether the UE is using 5G as secondary radio).

Some operators have dedicated IMSI ranges for 5G subscribers. For this reason, the Analysis Function can be configured to check whether the IMSI in the captured ULR message is associated with 5G-UE 18 or 4G-UE 20. If the IMSI is associated with 5G-UE 18, GTP-Proxy 28 will direct data traffic to a 5G-PGW 32. Otherwise, if the IMSI is not associated with 5G-UE 18, GTP-Proxy 28 will direct data traffic to a 4G-PGW 34.

Furthermore, the Analysis Function can be configured to analyze ULR and ULA messages to determine whether the UE is a 5G-UE 18 or 4G-UE 20. This can be accomplished in the manner described below using reference to FIGS. 4 and 5.

FIG. 4 depicts the format of a Diameter S6a ULR message. ULR messages are used to update location of a UE with HSS 24. When a UE attaches to MME 22, MME 22 sends an ULR message to HSS 24 to update the UE location. Each attribute in a Diameter message is called an 'Attribute-Value-Pair (AVP),' which can be mandatory or optional. FIG. 4 depicts that the ULR message includes an AVP 'Supported-Features,' which is used to indicate the supported features of MME 22 so that HSS 24 can determine a specific feature that can be applicable and realized in MME 22. Details of the ULR messages are defined in 3GPP TS29.272. An ULR message has two Feature-List-IDs, which are defined as either '1' or '2'. Each feature is represented by a bit in these 32-bit values. Bit #27 of Feature-ID-2 indicates 'Support of NR as Secondary RAT,' which is used in the present invention to identify whether a UE is a 5G-UE 18 or 4G-UE 20. In S6a, if the UE is a 5G-UE 20, Bit #27 of Feature-ID-2 is set to '1' to indicate that MME 22 supports NR as secondary RAT, then the UE is a 5G-UE 18.

FIG. 5 depicts the format of a Diameter ULA message. ULA messages are sent from HSS 24 to reply to a ULR from MME 22. FIG. 5 depicts that a ULA message has an AVP 'Subscription-Data,' which is used to indicate the subscription data of the UE in the HSS profile. A ULA message also includes an AVP 'Access-Restriction-Data,' which is used to indicate whether there are any restrictions in the access. Bit #8 of 'Access-Restriction-Data] AVP is used to indicate 'NR as Secondary RAT in E-UTRAN Not Allowed'. If this bit is set to 1, then UE shall not be allowed to use NR as secondary RAT and, therefore, the UE will not have 5G connectivity. Details of ULA messages are defined in 3GPP TS29.272.

Next, referring back to FIG. 3, after initial registration, 5G-UE 18 will attempt to establish Packet-Data Protocol (PDP) session for data traffic. To establish the PDP session, a Serving Gateway (SGW) 36 sends a GTPv2 Create-Session-Request via the GTP-C protocol. GTP is the interface protocol between SGW 36 and 5G-PGW 32 or 4G-PGW 34. FIG. 3 depicts that GTP-Proxy 28 is configured to intercept and redirect GTP message between SGW 36 and 5G-PGW 32/4G-PGW 34.

After the GTP-C message is intercepted by a GTP-Proxy 28, GTP-Proxy 28 checks, using the UE IMSI as a matching key, whether there was a previous intercepted ULR/ULA S6a message carrying a 5G secondary radio indicator for the UE IMSI. If there is no such indicator, GTP-Proxy 28 redirects the GTPv2 Create-Session-Request to 4G-PGW 34. However, if GTP-Proxy 28 determines that the 5G indicator was present in the previously captured ULR/ULA message, GTP-Proxy 28 concludes that the UE is a 5G-UE 18, and, responsive to this conclusion, GTP-Proxy 28 redirects the GTPv2 Create-Session-Request to 5G-PGW 32.

Figure 6:
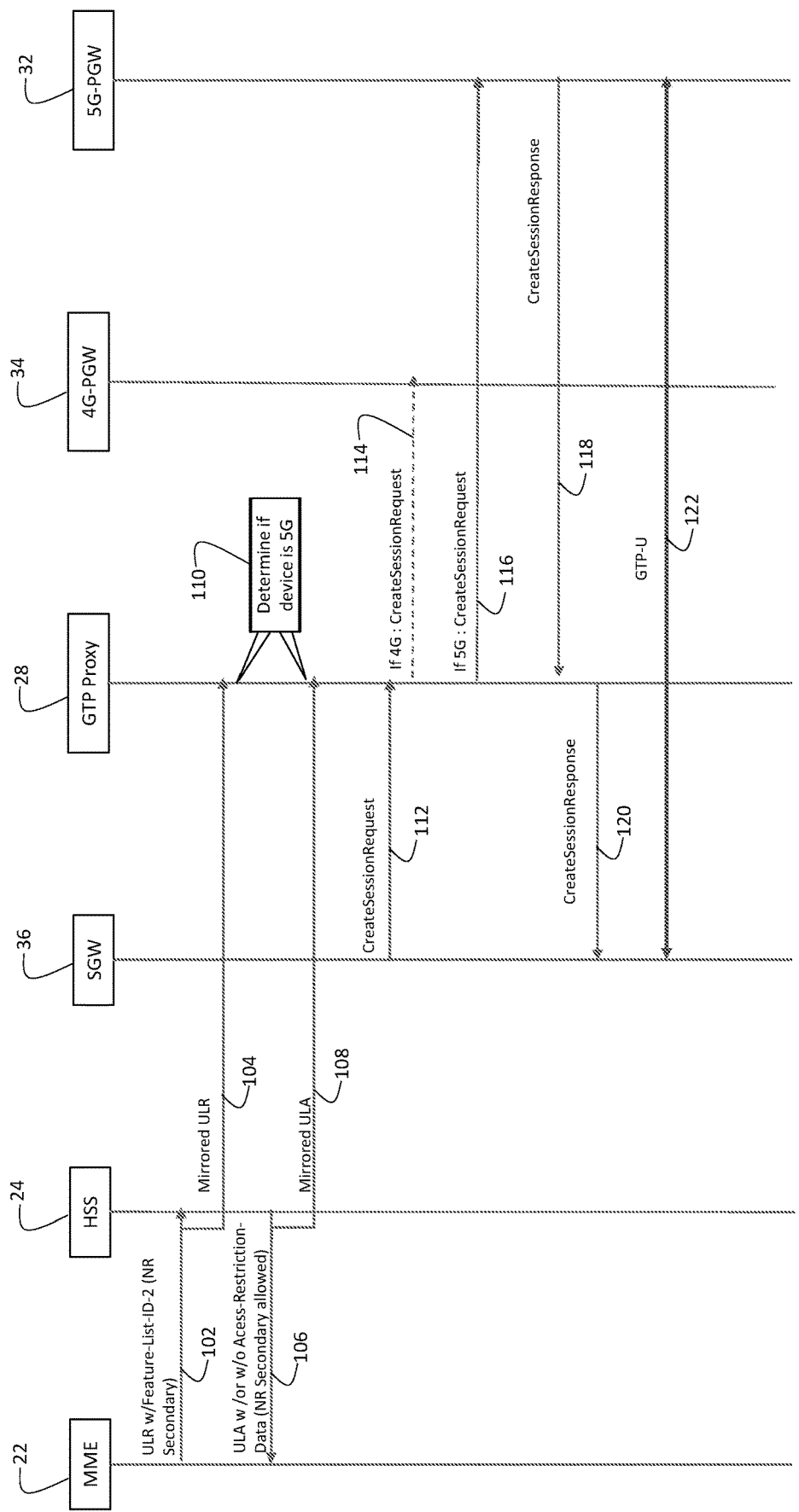
FIG. 6 is a sequential signaling flow diagram schematically depicting an embodiment in which the GTP-Proxy is configured to route 5G traffic to a 5G-PGW and 4G traffic to a 4G-PGW.

FIG. 6 is a diagram depicting the signaling flow in the embodiment of the invention depicted in FIG. 3, in which 5G traffic is routed to a dedicated 5G-PGW 32, while 4G traffic is routed to a 4G-PGW 34 5G. FIG. 6 depicts that when a 5G device is attached with NSA Option-3, MME 22 sends a Diameter ULR to HSS 24 in step 102. The Diameter ULR may carry an AVP having a Feature-Id-2 #27 indicating 'NR as Secondary RAT.' In step 104, ULR is mirrored to GTP-Proxy 28. In step 106, HSS 24 replies to MME 22 with a ULA, which may include the 'Access-Restriction-Data' bit #8 to indicate 'NR as Secondary RAT in E-URTRAN Not Allowed.' In step 108, the ULA is mirrored to GTP-Proxy 28. GTP-Proxy 28 includes the Analysis Function to analyze the Diameter attributes of the mirrored ULR and ULA messages which, in step 110, determines whether the current UE is a 5G-UE 18 or a 4G-UE 20.

Next, when a UE establishes a PDP session, SGW 36 sends a GTP Create-Session-Request to a PGW in step 112. The IP address of PGW is configured in a Domain Name Server (DNS). In the present invention, the DNS is configured with the IP address of GTP-Proxy 28, enabling GTP-Proxy 28 to intercept the GTP Create-Session-Request. Upon receiving the GTP Create-Session-Request, GTP-Proxy 28, using IMSI as a key, checks whether there had been a mirrored S6a ULR indicating 'NR as Secondary RAT'. If there is no such indicator, the PDP session is considered as 4G and will be routed to 4G-PGW 34 in step 114. On the other hand, if GTP-Proxy 28 determines that there had been a mirrored ULR indicating 'NR as Secondary RAT,' GTP-Proxy 28 will classify the PDP session as 5G, will skip the step 114 and, instead, will route the Create-Session-Request to 5G-PGW 32 in step 116. In step 118, 5G-PGW 32 sends Create-Session-Response to GTP-Proxy 28, and, in step 120, GTP-Proxy 28 forwards the Create-Session-Response to SGW 36.

FIG. 6 further depicts that GTP-Proxy 28 operates in a 'redirect' mode such that only the initial Create-Session-Request and Create-Session-Response messages are routed via GTP-Proxy 28. All subsequent GTP-C (such as Create-BearerRequest/Response, ModifyBearerRequest/Response or DeleteSessionRequest/Response), as well as GTP-U, are exchanged directly between SGW 36 and 5G-PGW 32 in step 122. This 'redirect' mode is realized by setting IP address of 5G-PGW 32, instead of IP address of GTP-Proxy 28 in 'Fully Qualified Tunnel Endpoint Identifier' (F-TEID) of Create-Session-Request/Response messages.

Figure 7:
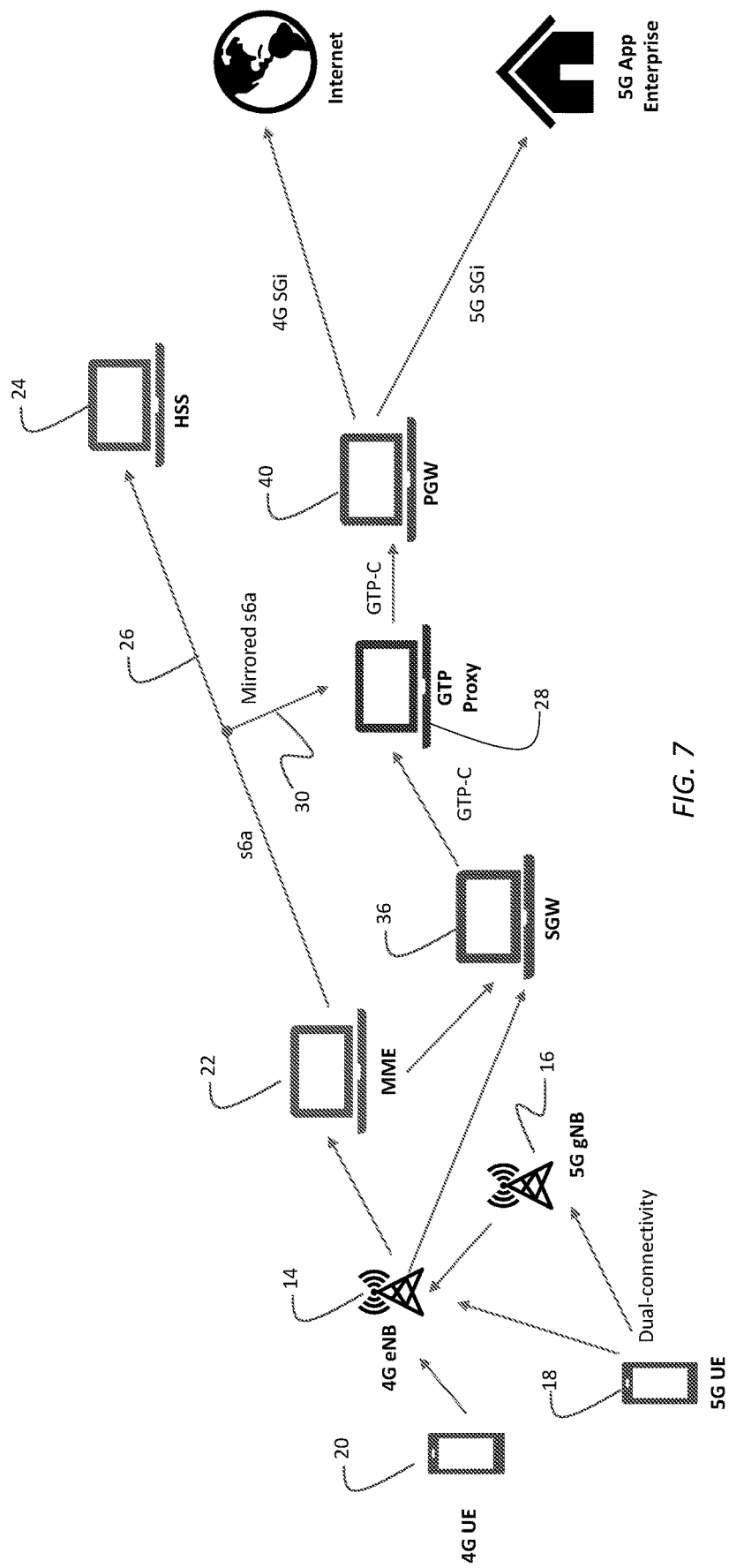
FIG. 7 is a diagram depicting architecture of an embodiment of the invention in which the mobile network has a single PGW for both 4G data traffic and 5G data traffic.

FIG. 7 depicts an embodiment of the invention in which only a single PGW 40 is deployed. In this embodiment, instead of routing 5G and 4G traffic to different PGWs specifically dedicated to either 5G or 4G data traffic, GTP-Proxy 28 routes all traffic to PGW 40. In this embodiment, when GTP-Proxy 28 determines that a Create-Session-Request intercepted from SGW 36 (using the methods described above) is associated with a 5G-UE 18, GTP-Proxy 28 modifies Access Point Name (APN) to a predefined value in the GTP Create-Session-Request message so that PGW 40 can handle the 5G traffic differently than 4G traffic. Alternatively, or additionally, GTP-Proxy 28 can be configured to modify an unused Information Element (IE), for example IE 206, of the GTP Create-Session-Request with a specific value in the GTP Create-Session-Request message so that PGW 40 can handle the 5G user data differently than 4G.

Figure 8:
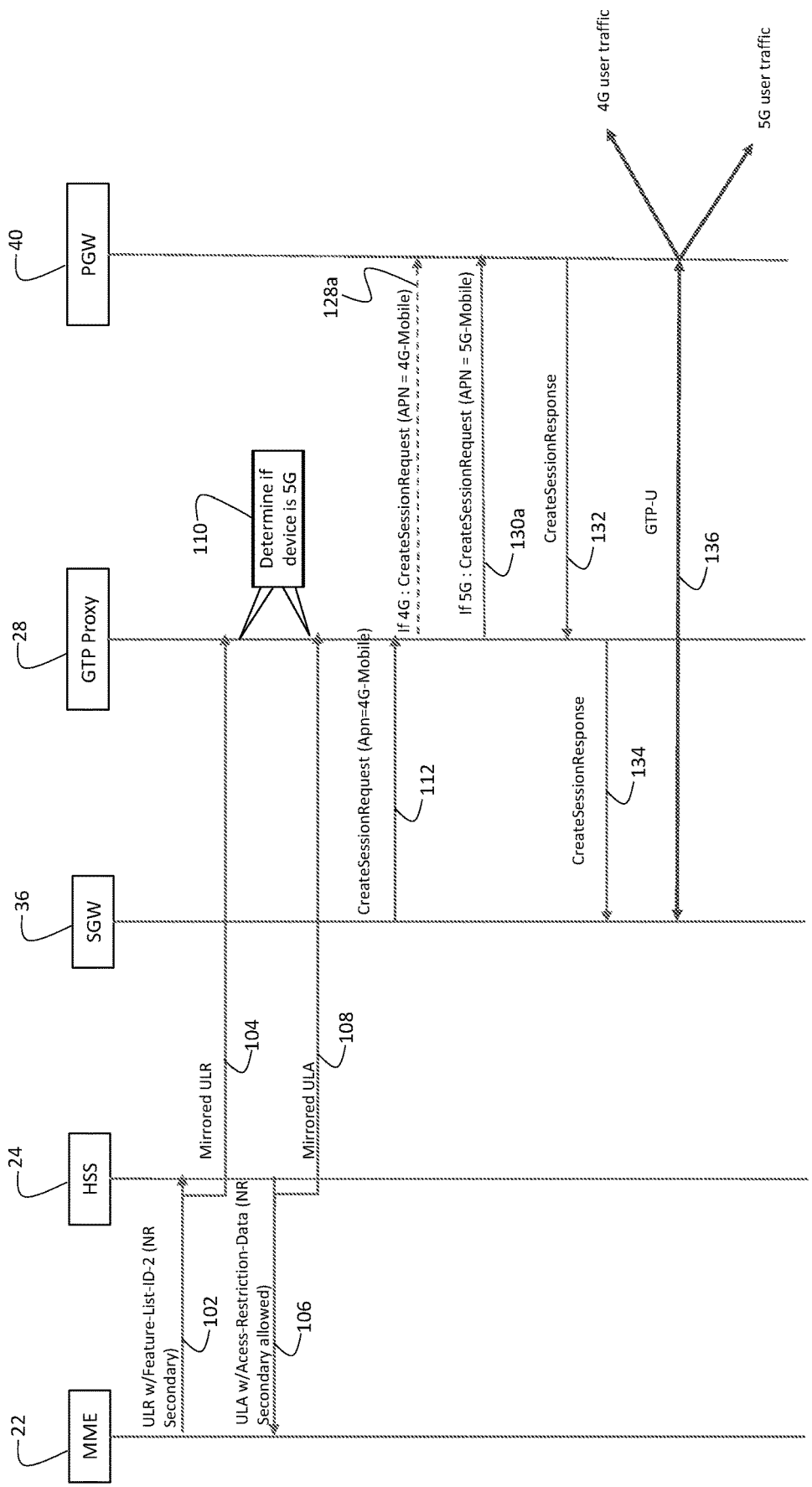
FIG. 8 is a sequential signaling flow diagram schematically depicting an embodiment in which the GTP-Proxy is configured to route 4G and 5G traffic to the same PGW, but with a modified Access Point Name (APN) in the GTP Create-Session-Request message enabling the PGW to handle the 5G traffic differently than 4G traffic.

FIG. 8 is a signaling flow diagram depicting the signaling flow in the embodiment depicted in FIG. 7. In this embodiment, GTP-Proxy 28 is configured to route 4G and 5G traffic to the same PGW 40, but with a different Access Point Name (APN). In this embodiment, steps 102 through 112 are the same as steps 102 through 112 discussed with respect to FIG. 6. In step 110, GTP-Proxy 28 determines whether the current UE is a 5G-UE 18 or a 4G-UE 20 based on mirrored ULR/ULA messages.

Next, in in step 112, GTP-Proxy 28 receives GTP Create-Session-Request from SGW 36. Upon receiving the GTP Create-Session-Request, using IMSI as a key, GTP-Proxy 28 checks whether there had been a mirrored ULR and/or ULA indicating that the UE is a 5G-UE 18. If there is no such indicator, the PDP session is considered as 4G and will be routed to PGW 34 in step 128a without any changes. However, if GTP-Proxy 28 determines that there had been a mirrored ULR indicating that the UE is a 5G-UE 18, step 128a is omitted. Instead, GTP-Proxy 28 modifies an APN value of the GTP Create-Session-Response to indicate that the session is a 5G session. For example, while the normal 4G APN may be '4G-Mobile', GTP-Proxy may modify the APN to '5G-Mobile' for 5G traffic. In step 130a, GTP-Proxy 28 sends the Create-Session-Request to PGW 40. When PGW 40 receives this Create-Session-Request with the specific APN, PGW 40 can handle the 5G traffic differently than 4G traffic. Next, in step 132, 5G-PGW 32 sends a Create-Session-Response to GTP-Proxy 28, which, in step 134, forwards the Create-Session-Response to SGW 36.

FIG. 8 further depicts that GTP-Proxy 28 operates in a 'redirect' mode such that only the initial Create-Session-Request and Create-Session-Response messages are routed via GTP-Proxy 28. All subsequent GTP-C (such as Create-BearerRequest/Response, ModifyBearerRequest/Response or DeleteSessionRequest/Response), as well as GTP-U, are exchanged directly between SGW 36 and 5G-PGW 32 in step 136. This 'redirect' mode is realized by setting IP address of PGW 40, instead of IP address of GTP-Proxy 28 in 'Fully Qualified Tunnel Endpoint Identifier' (F-TEID) of Create-Session-Request/Response messages.

Figure 9:
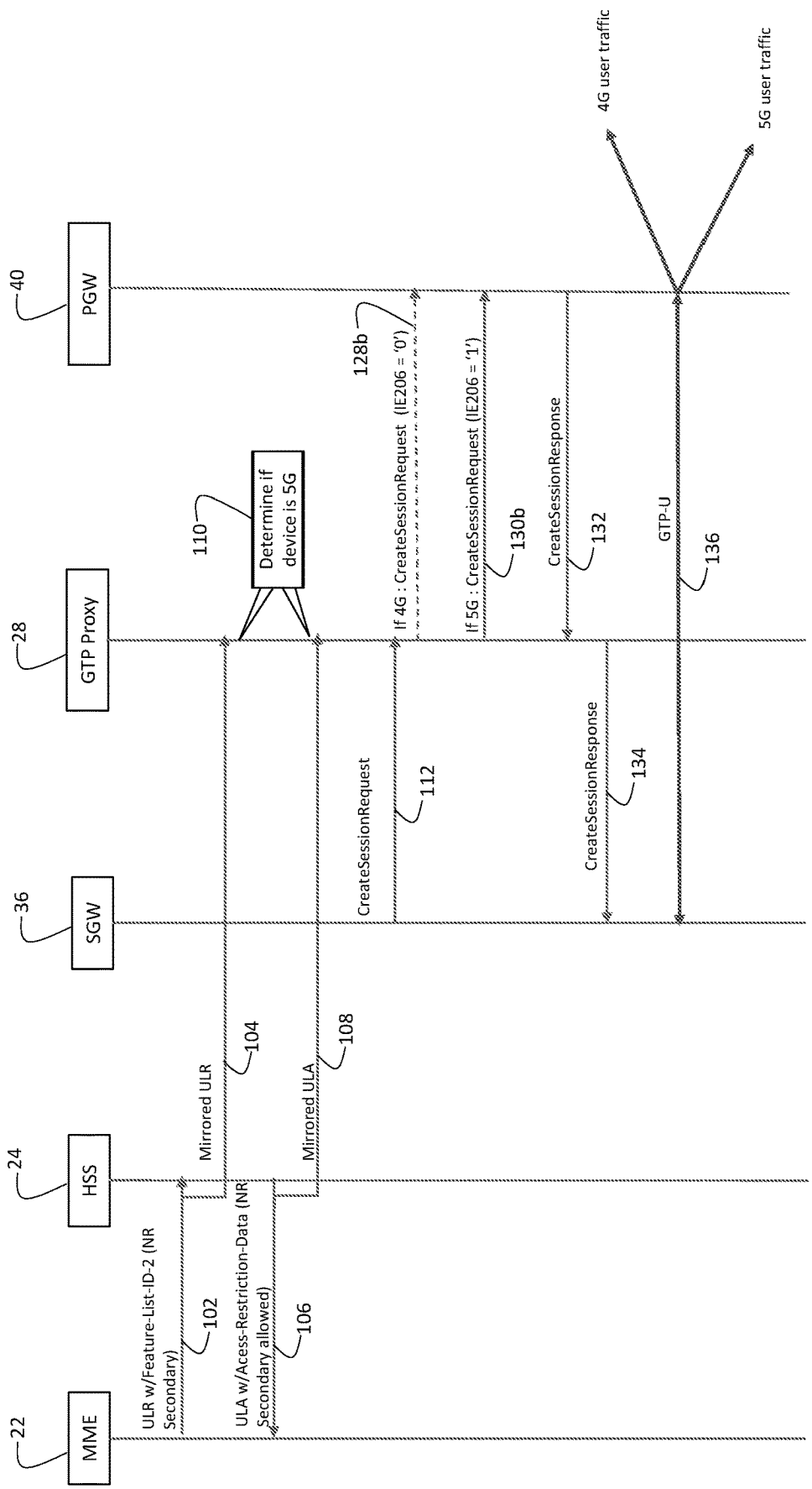
FIG. 9 is a sequential signaling flow diagram schematically depicting an embodiment in which the GTP-Proxy is configured to route 4G and 5G traffic to the same PGW, but with a modified value of an Information Element (IE) in the GTP Create-Session-Request message enabling the PGW to handle the 5G traffic differently than 4G.

FIG. 9 depicts a singling flow diagram for an embodiment similar to that depicted in FIG. 8—however, instead of modifying the APN of the Create-Session-Request, GTP-Proxy 28 modifies a GTP Information Element of the Create-Session-Request. In this embodiment, GTP-Proxy 28 sets an integer value of unused IE (such as IE206) of GTP-C Create-Session-Request to a specific value to enable PGW 40 to differentiate 4G traffic from 5G traffic. For example, responsive to determining that the UE is a 4G-UE 20, GTP-Proxy 28 can be configured to leave IE206 empty or set it to '0' for 4G traffic, in step 128b. In alternative, responsive to determining that the UE is a 5G-UE 18, GTP-Proxy 28 sets the value IE206 to '1' for 5G device traffic and sends the modified Create-Session-Request to PGW 40 in step 130b. When PGW 40 receives this Create-Session-Request with this indicator, PGW 40 will handle the 5G traffic differently. Steps 132-136 are the same as those discussed with respect to FIG. 8.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method for routing 5G mobile data traffic toward a Packet Data Network Gateway (PGW) in a mobile network implementing a 5G Non-Standalone (NSA) deployment, the method comprising:
   receiving, via a S6a mirrored data feed, a S6a Diameter message transmitted between a Mobility Management Entity (MME) and a Home Subscriber Server (HSS), wherein the S6a Diameter message includes an identifier for a User Equipment (UE) attached with the mobile network;
   determining whether the S6a Diameter message indicates that the UE is configured for a 5G data connection or a 4G data connection;
   responsive to determining that the UE is configured for the 5G data connection, storing the identifier for the UE in a database;
   intercepting a General Packet Radio Services Tunneling Protocol (GTP) message from a Serving Gateway (SGW) for creating a Packet-Data Protocol (PDP) session for the UE;
   determining whether the GTP message carries the identifier of the UE that has been determined to be configured for the 5G data connection based on the Sha Diameter message received via the Sha mirrored data feed;
   responsive to determining that the GTP message carries the identifier of the UE configured for the 5G data connection, setting an Information Element (IE) included in the GTP message to a predefined value to indicate that the PDP session is the 5G PDP session; and
   sending the GTP message to the PGW to create a 5G PDP session for the UE.

2. The method of claim 1, further comprising responsive to determining that the GTP message carries the identifier of the UE configured for the 5G data connection, modifying an Access Point Name (APN) included in the GTP message to indicate that the PDP session is the 5G PDP session.

3. The method of claim 1, wherein the PGW is a 5G-PGW configured for the 5G mobile data traffic.

4. The method of claim 1, wherein the Sha Diameter message is an Update-Location-Request (ULR) message or an Update-Location-Answer (ULA) message.

5. The method of claim 4, wherein whether the UE is configured for the 5G data connection is determined based on an Attribute-Value-Pair (AVP) of the ULR message.

6. The method of claim 5, wherein whether the UE is configured for the 5G data connection is determined based on a value of Feature Bit #27 'NR as Secondary RAT' in a 'Feature-List-ID 2' field of a 'Supported Features' AVP of the ULR message.

7. The method of claim 4, wherein whether the UE is configured for the 5G data connection is determined based on an AVP of the ULA message.

8. The method of claim 7, wherein whether the UE is configured for the 5G data connection is determined based on a value of Bit #8 'NR as Secondary RAT in E-UTRAN Not Allowed' in an 'Access Restriction Data' field in a 'Subscription Data' AVP of the ULA message.

9. The method of claim 1, wherein the GTP message is received by a GTP-Proxy, the GTP-Proxy being configured to modify the GTP message to indicate that the UE is configured for the 5G data connection.

10. A routing platform for routing 4G and 5G mobile data traffic in a mobile network implementing a 5G Non-Standalone (NSA) deployment and having a 5G Packet Data Network Gateway (PGW) for the 5G mobile data traffic and a 4G-PGW for the 4G mobile data traffic, the routing platform comprising:
 a Packet Mirror function configured to capture a Sha Diameter message transmitted between a Mobility Management Entity (MME) and a Home Subscriber Server (HSS), wherein the Sha Diameter message is associated with a User Equipment (UE) attached with the mobile network;
 an Analysis Function configured to determine whether the Sha Diameter message captured by the Packet Mirror function indicates that the UE is configured for a 5G data connection or a 4G data connection; and
 a General Packet Radio Services Tunneling Protocol (GTP) Proxy in communication with a Severing Gateway (SGW), the GTP-Proxy being configured to receive a GTP message from the SGW for creating a Packet-Data Protocol (PDP) session for the UE, wherein, responsive to the Analysis Function determining that the UE is configured for the 5G data connection, the GTP-Proxy is configured to set an Information Element (IE) included in the GTP message to a predefined value to indicate that the PDP session is the 5G PDP session and to send the GTP message toward the 5G-PGW thereby enabling creation of a 5G PDP session for the UE with the mobile network.

11. The routing platform of claim 10, wherein the Sha Diameter message captured by the Packet Mirror function is an Update-Location-Request (ULR) message or an Update-Location-Answer (ULA).

12. The routing platform of claim 11, wherein the Analysis Function determines whether the UE is configured for the 5G data connection based on an Attribute-Value-Pair (AVP) of the ULR message.

13. The routing platform of claim 12, wherein the Analysis Function determines whether the UE is configured for the 5G data connection based on a value of Feature Bit #27 'NR as Secondary RAT' in a 'Feature-List-ID 2' field of a 'Supported Features' AVP of the ULR message.

14. The routing platform of claim 11, wherein the Analysis Function determines whether the UE is configured for the 5G data connection based on an AVP of the ULA message.

15. The routing platform of claim 14, wherein he Analysis Function determines whether the UE is configured for the 5G data connection based on a value of Bit #8 'NR as Secondary RAT in E-UTRAN Not Allowed' in an 'Access Restriction Data' field in a 'Subscription Data' AVP of the ULA message.

16. The routing platform of claim 10, wherein the Analysis Function identifies an International Mobile Subscriber Identity (IMSI) of the UE configured for the 5G data connection from the Sha Diameter message captured by the Packet Mirror function.

17. The routing platform of claim 16, wherein the GTP-Proxy sends the GTP message toward the 5G-PGW responsive to the GTP-Proxy determining that the GTP message is associated with the IMSI of the UE configured for the 5G data connection.

18. The routing platform of claim 16, wherein the GTP-Proxy sends the GTP message toward the 4G-PGW responsive to the GTP-Proxy determining that the GTP message is not associated with the IMSI of the UE configured for the 5G data connection.

19. The routing platform of claim 10, wherein the Analysis Function is included in the GTP-Proxy and wherein the S6a Diameter message captured by the Packet Mirror function is sent to the GTP-Proxy via a S6a mirrored data feed.

20. A method for routing 5G mobile data traffic toward a Packet Data Network Gateway (PGW) in a mobile network implementing a 5G Non-Standalone (NSA) deployment, the method comprising:
 receiving, via a Sha mirrored data feed, a Sha Diameter message transmitted between a Mobility Management Entity (MME) and a Home Subscriber Server (HSS), wherein the Sha Diameter message includes an identifier for a User Equipment (UE) attached with the mobile network, wherein the Sha Diameter message is an Update-Location-Request (ULR);
 determining whether the Sha Diameter message indicates that the UE is configured for a 5G data connection or a 4G data connection, wherein whether the UE is configured for the 5G data connection is determined based on an Attribute-Value-Pair (AVP) of the ULR message;
 responsive to determining that the UE is configured for the 5G data connection, storing the identifier for the UE in a database;
 intercepting a General Packet Radio Services Tunneling Protocol (GTP) message from a Serving Gateway (SGW) for creating a Packet-Data Protocol (PDP) session for the UE;
 determining whether the GTP message carries the identifier of the UE that has been determined to be configured for the 5G data connection based on the Sha Diameter message received via the Sha mirrored data feed; and
 responsive to determining that the GTP message carries the identifier of the UE configured for the 5G data connection, sending the GTP message to the PGW to create a 5G PDP session for the UE.

21. The method of claim 20, further comprising responsive to determining that the GTP message carries the identifier of the UE configured for the 5G data connection, modifying an Access Point Name (APN) included in the GTP message to indicate that the PDP session is the 5G PDP session.

22. The method of claim 20, further comprising responsive to determining that the GTP message carries the identifier of the UE configured for the 5G data connection, setting an Information Element (IE) included in the GTP message to a predefined value to indicate that the PDP session is the 5G PDP session.

23. The method of claim 20, wherein the PGW is a 5G-PGW configured for the 5G mobile data traffic.

24. The method of claim 20, wherein whether the UE is configured for the 5G data connection is determined based on a value of Feature Bit #27 'NR as Secondary RAT' in a 'Feature-List-ID 2' field of a 'Supported Features' AVP of the ULR message.

25. The method of claim 20, wherein the GTP message is received by a GTP-Proxy, the GTP-Proxy being configured to modify the GTP message to indicate that the UE is configured for the 5G data connection.

26. A routing platform for routing 4G and 5G mobile data traffic in a mobile network implementing a 5G Non-Standalone (NSA) deployment and having a 5G Packet Data Network Gateway (PGW) for the 5G mobile data traffic and a 4G-PGW for the 4G mobile data traffic, the routing platform comprising:

a Packet Mirror function configured to capture a Sha Diameter message transmitted between a Mobility Management Entity (MME) and a Home Subscriber Server (HSS), wherein the Sha Diameter message is associated with a User Equipment (UE) attached with the mobile network, wherein the Sha Diameter message is an Update-Location-Request (ULR);

an Analysis Function configured to determine whether the Sha Diameter message captured by the Packet Mirror function indicates that the UE is configured for a 5G data connection or a 4G data connection, wherein whether the UE is configured for the 5G data connection is determined based on an Attribute-Value-Pair (AVP) of the ULR message; and a General Packet Radio Services Tunneling Protocol (GTP) Proxy in communication with a Severing Gateway (SGW), the GTP-Proxy being configured to receive a GTP message from the SGW for creating a Packet-Data Protocol (PDP) session for the UE, wherein, responsive to the Analysis Function determining that the UE is configured for the 5G data connection, the GTP-Proxy is configured to send the GTP message toward the 5G-PGW thereby enabling creation of a 5G PDP session for the UE with the mobile network.

27. The routing platform of claim 26, wherein the GTP-Proxy is configured to set an Information Element (IE) included in the GTP message to a predefined value to indicate that the PDP session is the 5G PDP session.

28. The routing platform of claim 26, wherein the Analysis Function determines whether the UE is configured for the 5G data connection based on a value of Feature Bit #27 'NR as Secondary RAT' in a 'Feature-List-ID 2' field of a 'Supported Features' AVP of the ULR message.

29. The routing platform of claim 26, wherein the Analysis Function identifies an International Mobile Subscriber Identity (IMSI) of the UE configured for the 5G data connection from the Sha Diameter message captured by the Packet Mirror function.

30. The routing platform of claim 29, wherein the GTP-Proxy sends the GTP message toward the 5G-PGW responsive to the GTP-Proxy determining that the GTP message is associated with the IMSI of the UE configured for the 5G data connection.

31. The routing platform of claim 29, wherein the GTP-Proxy sends the GTP message toward the 4G-PGW responsive to the GTP-Proxy determining that the GTP message is not associated with the IMSI of the UE configured for the 5G data connection.

32. The routing platform of claim 26, wherein the Analysis Function is included in the GTP-Proxy and wherein the Sha Diameter message captured by the Packet Mirror function is sent to the GTP-Proxy via a Sha mirrored data feed.

33. A method for routing 5G mobile data traffic toward a Packet Data Network Gateway (PGW) in a mobile network implementing a 5G Non-Standalone (NSA) deployment, the method comprising:

receiving, via a S6a mirrored data feed, a S6a Diameter message transmitted between a Mobility Management Entity (MME) and a Home Subscriber Server (HSS), wherein the S6a Diameter message includes an identifier for a User Equipment (UE) attached with the mobile network, wherein the S6a Diameter message is an Update-Location-Answer (ULA) message;

determining whether the S6a Diameter message indicates that the UE is configured for a 5G data connection or a 4G data connection;

responsive to determining that the UE is configured for the 5G data connection, storing the identifier for the UE in a database;

intercepting a General Packet Radio Services Tunneling Protocol (GTP) message from a Serving Gateway (SGW) for creating a Packet-Data Protocol (PDP) session for the UE;

determining whether the GTP message carries the identifier of the UE that has been determined to be configured for the 5G data connection based on the Sha Diameter message received via the Sha mirrored data feed, wherein whether the UE is configured for the 5G data connection is determined based on an AVP of the ULA message; and responsive to determining that the GTP message carries the identifier of the UE configured for the 5G data connection, sending the GTP message to the PGW to create a 5G PDP session for the UE.

34. The method of claim 33, further comprising responsive to determining that the GTP message carries the identifier of the UE configured for the 5G data connection, modifying an Access Point Name (APN) included in the GTP message to indicate that the PDP session is the 5G PDP session.

35. The method of claim 33, further comprising responsive to determining that the GTP message carries the identifier of the UE configured for the 5G data connection, setting an Information Element (IE) included in the GTP message to a predefined value to indicate that the PDP session is the 5G PDP session.

36. The method of claim 33, wherein the PGW is a 5G-PGW configured for the 5G mobile data traffic.

37. The method of claim 33, wherein whether the UE is configured for the 5G data connection is determined based on a value of Bit #8 'NR as Secondary RAT in E-UTRAN Not Allowed' in an 'Access Restriction Data' field in a 'Subscription Data' AVP of the ULA message.

38. The method of claim 33, wherein the GTP message is received by a GTP-Proxy, the GTP-Proxy being configured to modify the GTP message to indicate that the UE is configured for the 5G data connection.

39. A routing platform for routing 4G and 5G mobile data traffic in a mobile network implementing a 5G Non-Standalone (NSA) deployment and having a 5G Packet Data Network Gateway (PGW) for the 5G mobile data traffic and a 4G-PGW for the 4G mobile data traffic, the routing platform comprising:

a Packet Mirror function configured to capture a Sha Diameter message transmitted between a Mobility Management Entity (MME) and a Home Subscriber Server (HSS), wherein the Sha Diameter message is associated with a User Equipment (UE) attached with the mobile network, wherein the Sha Diameter message is an Update-Location-Answer (ULA) message;

an Analysis Function configured to determine whether the Sha Diameter message captured by the Packet Mirror function indicates that the UE is configured for a 5G data connection or a 4G data connection, wherein whether the UE is configured for the 5G data connection is determined based on an Attribute-Value-Pair (AVP) of the ULR message; and a General Packet Radio Services Tunneling Protocol (GTP) Proxy in communication with a Severing Gateway (SGW), the GTP-Proxy being configured to receive a GTP message from the SGW for creating a Packet-Data Protocol (PDP) session for the UE, wherein, responsive to the Analysis Function determining that the UE is configured for the 5G data connection, the GTP-Proxy is configured to send the GTP message toward the 5G-PGW thereby enabling creation of a 5G PDP session for the UE with the mobile network.

40. The routing platform of claim 39, wherein the GTP-Proxy is configured to set an Information Element (IE) included in the GTP message to a predefined value to indicate that the PDP session is the 5G PDP session.

41. The routing platform of claim 39, wherein he Analysis Function determines whether the UE is configured for the 5G data connection based on a value of Bit #8 'NR as Secondary RAT in E-UTRAN Not Allowed' in an 'Access Restriction Data' field in a 'Subscription Data' AVP of the ULA message.

42. The routing platform of claim 39, wherein the Analysis Function identifies an International Mobile Subscriber Identity (IMSI) of the UE configured for the 5G data connection from the Sha Diameter message captured by the Packet Mirror function.

43. The routing platform of claim 42, wherein the GTP-Proxy sends the GTP message toward the 5G-PGW responsive to the GTP-Proxy determining that the GTP message is associated with the IMSI of the UE configured for the 5G data connection.

44. The routing platform of claim 42, wherein the GTP-Proxy sends the GTP message toward the 4G-PGW responsive to the GTP-Proxy determining that the GTP message is not associated with the IMSI of the UE configured for the 5G data connection.

45. The routing platform of claim 39, wherein the Analysis Function is included in the GTP-Proxy and wherein the Sha Diameter message captured by the Packet Mirror function is sent to the GTP-Proxy via a Sha mirrored data feed.

* * * * *